United States Patent [19]
Hutchison

[11] 4,240,406
[45] Dec. 23, 1980

[54] SOLAR REFLECTOR STRUCTURE

[75] Inventor: Joseph A. Hutchison, Dallas, Tex.

[73] Assignee: Solar Kinetics, Inc., Dallas, Tex.

[21] Appl. No.: 853,213

[22] Filed: Nov. 21, 1977

[51] Int. Cl.³ ................................................. F24J 3/02
[52] U.S. Cl. ................................... 126/438; 350/293; 126/451
[58] Field of Search ............... 126/270, 271, 438, 439, 126/417, 451; 350/296, 293

[56] References Cited

U.S. PATENT DOCUMENTS

| | | | |
|---|---|---|---|
| 2,906,257 | 9/1959 | Abbot | 126/271 |
| 2,945,234 | 7/1960 | Driscoll | 126/270 X |
| 3,023,860 | 3/1962 | Ellzey | 244/119 |
| 3,959,056 | 5/1976 | Caplan | 126/271 X |
| 4,011,858 | 3/1977 | Hurkett | 126/271 |
| 4,098,264 | 7/1978 | Brokaw | 126/271 |
| 4,135,493 | 1/1979 | Kennedy | 126/271 |

OTHER PUBLICATIONS

Theory and Analysis of Flight Structures, R. M. Rivello, McGraw-Hill, Inc. N.Y. 1969, pp. 143-149.

*Primary Examiner*—James C. Yeung
*Assistant Examiner*—Larry Jones
*Attorney, Agent, or Firm*—Hubbard, Thurman, Turner, Tucker & Glaser

[57] ABSTRACT

An improved solar collector system includes a reflective surface to reflect solar radiation onto an energy receiver. The reflective surface is disposed along the surface of a movable support panel which is a monocoque sheet metal construction. Suitable control equipment is affixed to the support structure to enable the reflective surface to be oriented toward the sun to achieve maximum solar energy recovery.

7 Claims, 3 Drawing Figures

SOLAR REFLECTOR STRUCTURE

BACKGROUND OF THE INVENTION

This invention relates to an improved solar collector system.

In another aspect, this invention relates to a solar collector system wherein the reflective surfaces of the system are supported by an improved support structure. In still another aspect, this invention relates to a solar collector system wherein the reflective surfaces are disposed on a support structure having improved structural properties. In yet another aspect, this invention relates to a solar collector system wherein the entire system is constructed to withstand varying wind loads without decreasing the efficiency of the system.

Recent economic and political developments have resulted in a dramatic increase in the cost of energy sources such as conventional crude oil, natural gas and the like. Because of the increased prices of crude oil, natural gas and the like, and as a result of very real and potential shortages of such conventional energy sources, alternative sources of energy are being investigated. It has long been known that solar radiation or "solar energy" is a vast, untapped source of energy. Unfortunately, work done in the area of recovering energy from the sun has not been widespread due to economic reasons. Now, it is very apparent that the availability and price of conventional energy sources will make alternative energy sources economically competitive.

Much of the most recent investigations dealing with the recovery of solar energy has centered around studies of various solar collectors. Such solar collectors include tubes, mats, and other large surface area solar collectors that contain some type of working fluid that is heated by merely placing such large solar collectors in the sun. Such solar collectors are effective in heating the working fluids only a few degrees above the ambient temperature. Additionally, such large solar collectors are relatively expensive.

There are many types of solar collectors being designed and studied to gather solar energy and concentrate the solar energy into a relatively small area to thereby achieve high temperatures. Such solar collectors usually involve some type of lens or prism reflective means or some type of a reflective surface means that will concentrate solar radiation that is radiated onto a relatively large reflective surface area onto a relatively small target or energy collector means. It has been found that the use of highly reflective surfaces or mirror type surfaces are very effective for gathering solar radiation striking a relatively large effective area and focusing or concentrating the radiation onto a relatively small target area or energy receiver. Such types of solar collectors include a collection of many individual, flat mirrors that can be focused onto one small target or energy collector, as well as various types of curved and shaped reflective surfaces that will focus the thus collected solar energy onto a relatively small surface or energy receiver.

As the art of collecting solar energy has evolved, it has been found that the use of solar collectors that can be aimed directly at the sun to collect a maximum amount of solar radiation and thereby concentrate or focus the radiation by reflecting it onto a relatively small target or energy receiver are most desirable. Parabolic reflectors have been widely studied. However, as a result of the high cost of construction, as well as the technical problems in constructing such parabolic reflectors, such parabolic reflectors are not widely used for low cost energy recovery from the sun.

Recently, "trough-like" reflectors have been investigated as relatively low cost types of solar collectors. The trough-like reflectors have proven to be much less expensive to manufacture than true parabolic reflectors. Some of the most effective trough-like reflectors utilize a relatively large reflector surface that is formed by constructing an elongated trough-like means with the walls of the trough having a constant parabolic shape whereby the focal point of the parabolic trough lies along a relatively straight line above the parabolic trough. Thus, the concave trough-like solar collector can be equipped with a target or energy receiver that is disposed along the line formed by the focal point of the parabolic reflector. The most effective types of trough-like reflectors further include means for aiming or pointing the parabolic reflector toward the sun whereby the axis of the parabola is pointed as nearly as possible directly toward the sun. Suitable control and tracking mechanisms are known in the art whereby the axis of the parabola can substantially track the sun as the sun traverses the sky.

While the above-mentioned trough-like solar collectors are widely used in solar energy recovery systems, many problems still exist. Probably, one of the most serious problems connected with such trough-like reflectors is the formation of reflectorized surfaces that have substantially parabolic properties to insure proper focusing or targeting of the reflected solar energy on an energy receiver. Much work has been done on perfecting techniques for insuring a good paragolic surface area for such reflectors.

Probably, the most widespread method for forming such trough-like reflectors is to utilize a "torque tube" which is essentially a large diameter pipe, rod, or tube. Conventional methods for forming such trough-like reflectors utilize the torque tube as the central load bearing member and various ribs, beams, braces and the like are rigidly affixed to the torque tube. Once the ribs, beams or braces are rigidly affixed to the torque tube, the reflectorized surface of the solar collector is affixed to the upper surfaces of the ribs, beams or braces. One widespread method for forming the reflectorized surface is to bend and shape sheet metal to a desired configuration and thereafter rigidly affix the sheet metal to the ribs or beams which are, in turn, carried by the torque tube. Thereafter, the metal can either be polished or some type of reflective medium can be applied to the base to provide the reflective surface.

Since it is imperative that solar collectors be located out of doors to attain maximum energy recovery, it is apparent that a very real and serious problem is presented when large solar collectors are exposed to wind loads. Since the reflector surfaces are rather large in most cases, winds of even a moderate velocity will cause conventionally constructed solar collectors to bend and twist and even sometimes fail altogether as a result of the wind forces. The solution to the problem has been to add structural members that will stiffen and further brace the surfaces of the solar collector. As a result of such methods for increasing the structural integrity of solar collectors, most solar collectors are extremely heavy and cumbersome. This, of course, creates a problem when the solar collector must be placed on rooftops and the like. Additionally, the conventional types of solar collectors are all carried by the above-mentioned "torque tube" which must be designed to withstand tremendous torque stresses. However, no effective construction technique has been suggested for minimizing the weight of solar collectors that must be designed to withstand high wind loads.

It is, thus, very apparent that there is a need for improved solar collector systems. It is also evident that there is a tremendous need for solar collector systems that can be constructed of readily available materials and have light weight, but be of such construction as to withstand the ravages of high wind loads.

SUMMARY OF THE INVENTION

Accordingly, it is an object of this invention to provide an improved solar collector system. It is another object of this invention to provide an improved collector system having improved structural properties. It is yet another object of this invention to provide an improved solar collector system having improved structural properties with a lightweight construction. It is yet another object of this invention to provide an improved solar collector system that can be easily constructed, have a relatively lightweight construction and be able to withstand wind loads from any direction.

Other aspects, objects and advantages of this invention will be apparent to those skilled in the art from the following disclosure and appended claims.

In the instant invention, a solar collector system includes a solar collector that has a monocoque structure. The solar collector panel is preferably a parabolic trough type solar collector having a plurality of precision cast metal bulkheads or cast metal bulkheads with the concave portion of the bulkheads being machined to a close tolerance. The monocoque construction provides for stressed skin to be applied to the front and back portions of the rigid bulkheads in such a manner as to provide a unit monocoque construction of sufficient strength such that stresses exerted on the stressed skin structure are uniformly distributed, without concentration across the entire panel structure. The monocoque construction solar collector panel is preferably equipped with suitable means for affixing it to a support structure in such a manner that the panel can be rotated along an axis parallel to the long axis of the trough assembly. Suitable means for rotating the solar collector panel are included in the system. A target or energy collector is disposed along a line approximately at the focal point of the parabolic trough assembly.

DESCRIPTION OF PREFERRED EMBODIMENTS

Figure 1:
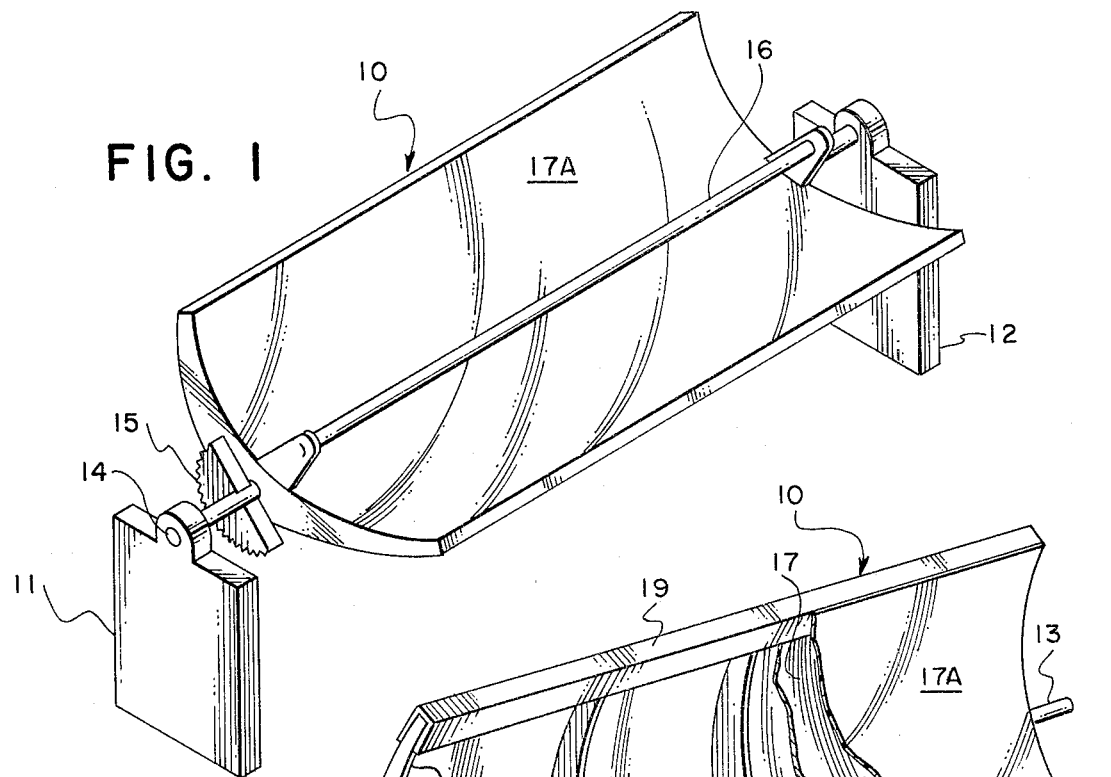
FIG. 1 is a perspective view of a solar collector system in accordance with the instant invention.
Figure 2:
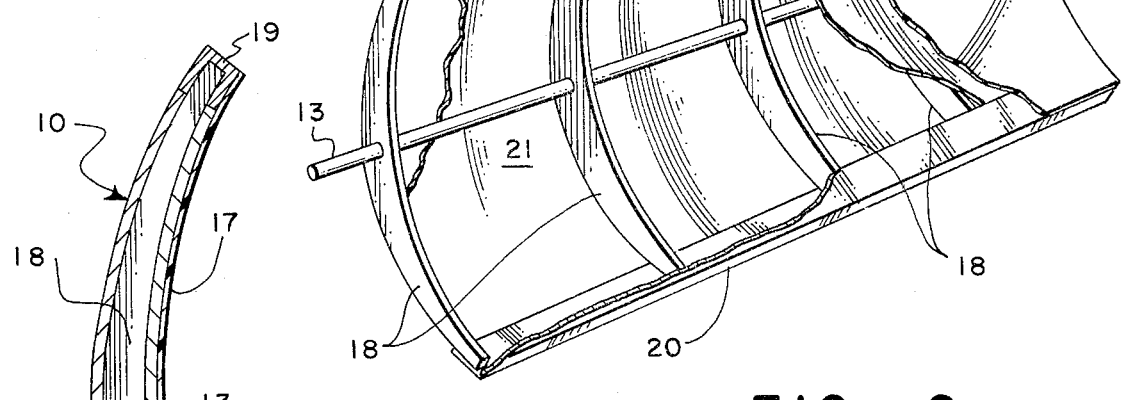
FIG. 2 is a perspective view of the monocoque construction of a solar collector panel made in accordance with the instant invention with portions of the reflective surfaces and skin surfaces removed to illustrate the method of construction.

The preferred embodiments of this invention can best be described by referring to the drawings. FIG. 1 illustrates a solar collector assembly in accordance with the instant invention. The trough-like solar collector panel 10 is supported by suitable support pylons 11 and 12. These support pylons can be rigidly mounted to any suitable support base, such as a roof top and the like. Rotation axle 13, as more clearly seen in FIG. 2, is journaled into bearing means which are rigidly affixed to support pylons 10 and 11. As shown in FIG. 1, bearing means 14 is affixed to the upper portion of support pylon 11 with rotation axle 13 journaled into such bearing means for rotation. Tracking gear 15 can be rigidly affixed to either rotation axle 13 or to the end of solar collector panel 10 in such a manner that a suitable motor means or other actuating device will cause the solar panel assembly to rotate about rotation axle 13 in response to a suitable signal. One suitable means for causing the rotation is to utilize a gear train that meshes with tracking gear 15 with said gear train being caused to rotate in either direction by a motor means, crank means and the like. The rotation is controlled by a sensing mechanism (not shown) which will insure the proper orientation of solar collector panel 10 toward the sun at all times to insure maximum exposure to radiation from the sun.

Collector tube 16 is disposed along the line which is the focal point of the solar collector. Reflective surface 17 is a highly polished, mirror-like material that will gather the incoming rays of the sun and will reflect them back to the focal point of the parabola which is occupied by collector tube 16. Suitable working fluids can be pumped through collector tube 16 to gather the solar energy in the form of sensible heat. Suitable means for pumping the working fluid through collector tube 16 are well known in the art and are not illustrate in FIG. 1.

In the monocoque construction of the solar collector panel of this invention, rigid bulkhead means 18 are made from a suitable material such as aluminum, magnesium alloy, steel and the like. The rigid bulkhead means are preferably made from cast material with the front or concave surfaces of the bulkhead being precision cast or machined to a close tolerance to form a substantially true parabolic shape. It will be appreciated that each of the separate bulkhead means 18 should be machined or cast to produce a front or concave surface that is substantially identical to all of the other bulkhead means in the construction. By using cast metallic bulkhead means that exhibit precision concave surfaces, superior results can be obtained by constructing the solar collector panel in accordance with this invention.

In constructing the solar collector panel of this invention, the plurality of bulkheads are held in the desired configuration to form the trough-like solar collector framework. Suitable jigs, clamping means and the like, can be utilized to hold the bulkhead means in place for assembly. It has been found desirable in some instances to utilize stringers or rods to run between the various bulkhead means to hold them in place during construction. In some instances, the stringers can function as rotation axles such as is illustrated in FIG. 2. As shown in FIG. 2, suitable apertures are placed through the plurality of bulkheads 18 and tubular stringer 13 can be inserted through the bulkhead means. As shown in FIG. 2, stringer 13 also serves as rotation axle 13 for supporting the solar collector panel on suitable support pylons after completion of construction. If desired, other stiffeners, stringers and the like, can be utilized to hold the bulkheads in place. Such other stringers, braces and the like, of course, will increase the overall structural weight of the solar collector panel. Due to the stressed skin construction of the monocoque solar panel, such other stringers, braces and the like, are not particularly necessary.

In order to obtain maximum efficiency of the solar collector panels of this invention, it has been found to be desirable in some instances to utilize edge formers 19 and 20 for attaching to the outer ends of bulkhead means 18. The edge formers 19 and 20 are preferably extruded from some lightweight but relatively strong metallic material with one base of the extruded edge formers being in a parabolic shape to match the machined parabolic shape of the bulkhead means to which it will be attached. Thus, the generally U-shaped edge formers will have one external edge having a parabolic shape which will function either as the reflective surface of the completed solar collector panel or the base for supporting such reflective surface. The thickness of the extruded edge formers will be such that when the concave skin of the solar collector panel is applied that a substantially continuous and uniform concave surface will be formed by the extension of the skin to the concave portion of the extruded edge formers. Thus, a substantially smooth and constant concave parabolic surface will be presented in the completed construction to achieve maximum efficiency in reflecting incoming sun rays onto the energy collector tube. The edge formers can also be formed from bent sheet metal material that can be bent of formed to the desired shape. It will be appreciated that such edge formers are not required in all instances because the front and rear stressed sheet metal skins adhered to the front and rear surfaces of the rigid metal bulkhead members produce an extremely strong lightweight monocoque structure that evenly distributes stresses throughout the panel.

The portion of the U-shaped extruded edge formers opposite from the above-mentioned concave surface will fit over the back side of the outer ends of the bulkhead means. Any suitable means for affixing the extruded edge formers to the outer ends of the bulkhead means can be utilized. Therefore, suitable techniques such as welding, bolting or the use of high performance adhesives, can be utilized to form the framework for the solar collector panel. It will be appreciated that the framework is extremely lightweight when compared with conventional solar collector panel constructions that utilize large torque tubes with ribs, braces and the like, for forming a conventional panel structure. Normally, the plurality of bulkhead members will be oriented substantially parallel to each other in such a manner with the front surfaces of each of the members aligned in such a manner to form a straight, trough-like configuration which serves as the base support for the front stressed metal skin.

Once the basic framework of the solar collector panel is completed, a suitable metallic skin can be applied over the front and back portions of the framework. In the construction of the solar panels of this invention, the sheet metal skin that is applied over the front and back portions of the framework is a stressed skin whereby any forces exerted on the structure will be uniformly distributed, without concentration, over the entire structure. The joinder between the edges of the stressed skin and the edges of extruded edge formers 19 and 20 should be of a suitable construction as to provide a joint which will transfer the stresses of the stressed skin to the extruded edge formers and vice versa. Such seams and joinders are well known in the art of monocoque construction.

The skin thickness should be of sufficient magnitude as to provide a unit monocoque construction that will withstand the design conditions for wind stresses and loads from any direction.

The front and rear stressed sheet metal skins are affixed to the front and rear surfaces of the bulkhead members by any suitable means such as by using screws, rivets, high strength adhesives, welding and the like.

The solar collector panels of this invention can be from relatively small panels to very large panels of up to twenty feet in length. Of course, the size and shape of the parabolic surface of the trough-like reflectors will determine the maximum width or height of the solar panels. It has been found that parabolic reflectors of up to about 100 degrees are most useful in the type of construction described herein. It has been found that it is very difficult to maintain the true parabolic surfaces of a metallic skin near a line where the skin is bent. Because of this problem, the extruded edge formers are especially useful in maintaining the true parabolic surfaces required for maximum efficiency of the solar collectors. Once the stressed metallic skin is in place over the front and back portions of the solar collector panels, the concave surfaces can be highly polished to thereby form the reflective surface of the solar collector panel system. In many instances, rather than polishing the metallic surfaces to form the desired reflective surface, it will be desirable to utilize a layer of reflective material such as a highly reflective film material that can be applied directly to the concave metallic surfaces. Such highly reflective film materials are well known in the art and can be applied to the concave metallic support surfaces, which are in the parabolic shape by known techniques. It will be appreciated that the solar collector panel construction of this invention is relatively lightweight when compared with conventional solar collector equipment. In some instances, it may be desirable to add additional means for improving the structural integrity of the solar collector panel. Conventional methods such as the incorporation of honeycomb reinforcing materials between the front and back skin sections of the solar collector can be utilized if desired.

The parabolic trough collector panels can be oriented in accordance with conventional techniques with the panels being oriented along either a north/south line or along an east/west line, depending on the tracking equipment available and other factors such as building location and size.

Figure 3:
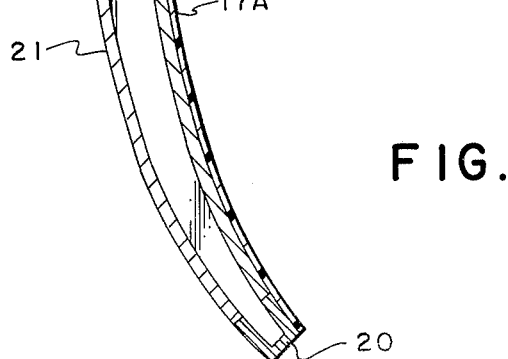
FIG. 3 is an end view of one of the machined bulkhead components utilized to construct the solar collector panel assembly of this invention.

The end view of solar collector panel 10 shown in FIG. 3 illustrates one preferred method for fabricating the panels. In FIG. 3, bulkhead 18 is cast and the concave face of the bulkhead member is machined to a true parabolic shape. Extruded edge formers 19 and 20 are fitted over the ends of bulkhead 18 and thereafter front stressed skin 17, which can serve as the reflector surface when polished, is applied to the concave surface of the bulkheads. As shown in FIGS. 2 and 3, however, a reflective surface 17A is applied over the front surface of stressed metal skin 17. Stressed skin 21 is applied to the back side of the bulkhead. The thickness of the front concave edge of edge formers 19 and 20 will be substantially the same thickness as stressed skin 17 in order to form the continuous and uniform parabolic shape desired to maximum operating efficiency. Any suitable means for applying stressed skins 17 and 21 to the bulkheads can be utilized. Thus, rivets, screws, adhesives and the like, can be utilized for affixing stressed skins 17 and 21 to the bulkhead sections.

While FIG. 2 illustrates stringer 13 which also serves as a rotation axle, it is not necessary in all cases to utilize such an axle that runs the entire length of the solar collector panel. Because of the monocoque construction technique described herein, the solar collector panels can have rotation axles affixed directly to the outboard bulkheads on the solar panel and the system can be supported in a suitable pylons means by journaling the rotation axles into bearings held by the pylon means. In some instances, the rotation axle can be affixed to the back side of the solar collector panel for desired construction.

In order to further decrease the weight of the completed construction panel, it may be desirable to have cut out portions through the sides of the individual bulkhead means, as long as the overall structural integrity of the bulkheads are not adversely affected by such cut out portions.

It is to be understood that various changes and modifications may be made in the foregoing description without departing from the spirit and scope of this invention.

The embodiments of the invention in which an exclusive property or privilege is claimed are defined as follows:

1. A solar reflector structure comprising
   (a) a plurality of rigid bulkhead members with each of said bulkhead members having a front surface and a rear surface and a top and bottom outer end, said front surface of each of said bulkhead members being formed in a predetermined contour;
   (b) a rear stressed sheet metal skin rigidly affixed to at least a portion of said rear surface of each of said bulkhead members and a front, stressed sheet metal skin rigidly affixed to at least a portion of said front surface of each of said bulkhead members thereby forming a monocoque structure wherein stresses exerted on said rear stressed skin and on said front stressed skin are distributed over the entire said reflector structure; and
   (c) a reflective surface supported by said front stressed sheet metal skin, said reflective surface reflecting solar radiation on a predetermined location said reflective surface having a cross-sectional contour defined by the contour of said front surface of said bulkhead members.

2. The solar reflector structure of claim 1 wherein said reflective surface is the polished surface of said front stressed sheet metal skin.

3. The solar reflector structure of claim 1 wherein said reflective surface is a layer of reflective material affixed to said front stressed sheet metal skin.

4. The solar reflector structure of claim 1 wherein the front surfaces of each of said bulkhead members are shaped in a substantially parabolic contour whereby said front stressed sheet metal skin is in a trough-like parabolic shape.

5. The solar reflector structure of claim 4 wherein top and bottom edge forming members are affixed to the top and bottom outer ends of each of said bulkhead members, said edge formers running substantially the length of said solar reflector.

6. The solar reflector structure of claim 4 further including axle means and bearing means, said axle means journaled into said bearing means whereby said solar reflector can be rotated in such a manner that said reflective surface faces the sun.

7. The solar reflector structure of claim 4 further including an energy collector means disposed along a focal line defined by said trough-like parabolic shape.

* * * * *